（12） United States Patent
Yu et al.

(10) Patent No.: US 12,104,979 B2
(45) Date of Patent: Oct. 1, 2024

(54) WHOLE VEHICLE IN-LOOP TEST SYSTEM OF INTELLIGENT AUTOMOBILE

(71) Applicant: TONGJI UNIVERSITY, Shanghai (CN)

(72) Inventors: Zhuoping Yu, Shanghai (CN); Xichan Zhu, Shanghai (CN); Lu Xiong, Shanghai (CN); Gang Xu, Shanghai (CN); Yi Zhou, Shanghai (CN); Biao Wu, Shanghai (CN); Rui Liu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 380 days.

(21) Appl. No.: 17/637,802

(22) PCT Filed: Sep. 28, 2020

(86) PCT No.: PCT/CN2020/118263
§ 371 (c)(1),
(2) Date: Feb. 24, 2022

(87) PCT Pub. No.: WO2021/098383
PCT Pub. Date: May 27, 2021

(65) Prior Publication Data
US 2022/0283056 A1    Sep. 8, 2022

(30) Foreign Application Priority Data
Nov. 23, 2019  (CN) .......................... 201911160403.1

(51) Int. Cl.
*G01M 17/007*  (2006.01)
(52) U.S. Cl.
CPC ................................ *G01M 17/007* (2013.01)

(58) Field of Classification Search
CPC ............... G01M 17/00; G01M 17/007; G01M 17/0072; G01M 17/0074; G01M 17/06; G01M 17/065
See application file for complete search history.

(56) References Cited

U.S. PATENT DOCUMENTS

| | | | |
|---|---|---|---|
| 8,955,397 B2* | 2/2015 | Saari ..................... | G01L 5/0052 73/862.381 |
| 2004/0134080 A1* | 7/2004 | Hara ........................ | G01L 5/20 33/203.13 |
| 2005/0014566 A1* | 1/2005 | Hashimoto ............ | A63G 31/16 472/59 |

FOREIGN PATENT DOCUMENTS

| | | |
|---|---|---|
| CN | 1440547 | 9/2003 |
| CN | 103149037 | 6/2013 |

(Continued)

OTHER PUBLICATIONS

"International Search Report (Form PCT/ISA/210) of PCT/CN2020/118263", mailed on Dec. 30, 2020, with English translation thereof, pp. 1-6.

*Primary Examiner* — Benjamin R Schmitt
(74) *Attorney, Agent, or Firm* — JCIP GLOBAL INC.

(57) ABSTRACT

A whole vehicle in-loop test system of an intelligent automobile, including: a rotary drum platform, used for simulating a longitudinal movement of a test vehicle; an environment perception platform, disposed at a front end of the rotary drum platform, used for simulating a transverse movement of a test vehicle, and including a support base at a lower portion and a vehicle placing platform at an upper portion, where a transverse drive wheel is mounted at the lower portion of the support base, and the transverse drive wheel moves along a transverse track disposed on the ground; and a target vehicle simulation unit, disposed at a (Continued)

periphery of the environment perception platform, and configured to simulate a target vehicle.

9 Claims, 3 Drawing Sheets

(56) References Cited

FOREIGN PATENT DOCUMENTS

| | | | | |
|---|---|---|---|---|
| CN | 107031392 | | 8/2017 | |
| CN | 206695996 | | 12/2017 | |
| CN | 109975035 | | 7/2019 | |
| CN | 109975035 A | * | 7/2019 | .......... G01M 17/007 |
| CN | 209198095 | | 8/2019 | |
| CN | 110887672 | | 3/2020 | |
| JP | 2015040762 | | 3/2015 | |

\* cited by examiner

WHOLE VEHICLE IN-LOOP TEST SYSTEM OF INTELLIGENT AUTOMOBILE

CROSS-REFERENCE TO RELATED APPLICATION

This application is a 371 of international application of PCT application serial no. PCT/CN2020/118263, filed on Sep. 28, 2020, which claims the priority benefit of China application no. 201911160403.1, filed on Nov. 23, 2019. The entirety of each of the above-mentioned patent applications is hereby incorporated by reference herein and made a part of this specification.

FIELD OF TECHNOLOGY

The present invention relates to the technical field of intelligent automobile tests, and in particular, to a whole vehicle in-loop test system of an intelligent automobile.

BACKGROUND

It is well known that a current conflict between an increase in a quantity of vehicles and a lack of a road capacity is a major challenge to an entire national transportation system. A lack of logistics and personnel transportation capacities not only causes a huge economic loss, but also causes many bad traffic and social problems, for example, various accidents generated due to traffic congestion.

In view of the foregoing problems, intensive and effective use for an existing road network is particularly important, where application of an advanced driver assistance system (ADAS) and an automatic driving system plays a role that cannot be ignored. The ADAS and the automatic driving system obtain road environment information by using a sensor device and a communication device, and perform analysis and processing by using an in-vehicle computer system, and then adjust a vehicle movement state by using an execution mechanism. For example, for an autonomous emergency braking (AEB) function, an in-vehicle radar is used for detecting a distance between a vehicle ahead or an obstacle and a current vehicle, a data analysis module is then configured to compare a measured distance with an alert distance and a safety distance. When the measured distance is less than the alert distance, an alert prompt is made, while when the measured distance is less than the safety distance, even if a driver does not brake the current vehicle, the emergency braking function is enabled to make the vehicle brake automatically, thereby effectively avoiding traffic accidents.

In-loop testing is an important part of testing research in the ADAS and the automatic driving system. The testing may be performed on functions of the system under a non-real simulated road condition, and especially, the testing is performed on various performance of the ADAS and the automatic driving system of the vehicle in a safety environment, to obtain real data of the sensor device and the execution mechanism of the vehicle, so as to help the development of the ADAS and the automatic driving system.

A vehicle-in-loop system focuses on testing a scenario in which a vehicle is at a high speed, and may convert an absolute movement of a high-speed vehicle into a relative movement of a low-speed vehicle. Some existing test product platforms may simulate situations such as braking of a vehicle ahead or a line change of a vehicle in a side lane when a test vehicle drives on a high-speed straight road, to detect the safety performance of the test vehicle. However, the test platform cannot rotate autonomously, a real weaving movement parameter of the test vehicle cannot be obtained, and scenarios such as a line change and driving on a curve of the test vehicle cannot be simulated either. In addition, because the test platform adopts a program-controlled electric vehicle to simulate a movement of another vehicle, the program-controlled electric vehicle with a limited speed cannot simulate a dangerous scenario of an oncoming vehicle of the test vehicle. Moreover, in the test platform, the sensor device cannot really detect a road environment. For example, an in-vehicle camera cannot record a real lane marking change, and cannot really and completely simulate a test scenario. The test platform has a limited test capability.

SUMMARY

An objective of the present invention is to provide a whole vehicle in-loop test system of an intelligent automobile to overcome the foregoing disadvantages in the prior art, so as to completely and really test the performance of a vehicle.

The objective of the present invention can be implemented by using the following technical solutions:

A whole vehicle in-loop test system of an intelligent automobile is provided. The system includes:
  a rotary drum platform, used for simulating a longitudinal movement of a test vehicle;
  an environment perception platform, used for simulating a transverse movement of the test vehicle; and
  a target vehicle simulation unit, configured to simulate a target vehicle,
  wherein the test vehicles are placed on the rotary drum platform and the environment perception platform respectively, all the test vehicles are connected to each other by a control subsystem, and the target vehicle simulation unit and the environment perception platform form a test scenario.

Further, the rotary drum platform includes a rotary drum base, and the rotary drum base is provided with a rotary drum and a vehicle fixing member configured to fix the test vehicle.

Further, the rotary drum is an adjustable-pitch rotary drum, and there are at least two pairs of adjustable-pitch rotary drums.

Further, the target vehicle simulation unit includes a program-controlled electric vehicle used for simulating a complex movement and a linear program-controlled electric vehicle or a traction balloon vehicle used for simulating a simple movement.

Further, the program-controlled electric vehicle includes a vehicle frame, a steering motor disposed in the vehicle frame, and a drive wheel assembly disposed at a bottom of the vehicle frame.

Further, the drive wheel assembly includes a drive motor and a wheel disposed on the drive motor, and the drive motor is disposed at a bottom of the vehicle frame through a drive motor base.

Further, the environment perception platform includes a support base and a vehicle placement platform connected to each other by a multi-degree of freedom movement mechanism configured to simulate pitch and roll movements of the vehicle, a transverse drive wheel is disposed at a bottom of the support base, and the transverse drive wheel moves along a transverse track disposed on the ground.

Further, the multi-degree of freedom movement mechanism includes a plurality of movable rods and a polygonal mounting base mounted on the support base, one end of the movable rod is connected to the polygonal mounting base, the other end is connected to the vehicle placing platform, and the movable rod is driven to move through a servo electric cylinder or an electric servo hydraulic cylinder.

Further, the vehicle placing platform is provided with an adjustable-pitch turntable mechanism, the adjustable-pitch turntable mechanism includes a sliding track, a turntable configured to fix a steering wheel of the test vehicle, and a servo unit configured to generate a steering resistance torque, the turntable is disposed on the sliding track, and is connected to the servo unit by a connecting rod assembly, and the servo unit is connected to the control subsystem, and is driven by an electric servo oil cylinder.

Further, the system uses a virtual map to mark a virtual position of the vehicle in a test.

Compared with the prior art, the present invention has the following advantages:

1. The system is provided with an environment perception platform, which may make a transverse movement, to simulate test scenarios of a line change and a lane change of a test vehicle.

2. The system is provided with the environment perception platform on which a six-degree-of-freedom movement mechanism is disposed, so that the test vehicle weaves, pitches, and rolls, a sensor device really detects a road environment and rotates autonomously, to obtain a real weaving movement parameter of the test vehicle, and scenarios such as a line change and driving on a curve of the test vehicle are simulated, which is more realistic in an actual process.

3. The system adopts a high-speed linear program-controlled electric vehicle or a traction balloon vehicle, which may simulate a dangerous scenario of an oncoming vehicle of the test vehicle based on speed and safety considerations, and is not limited in speed, so that this test is safer.

4. For a situation that there is no steering resistance when a steering operation is tested for the vehicle, an adjustable-pitch turntable mechanism is disposed, and a mechanism that reproduces a real steering resistance torque during vehicle steering is provided, so that the steering operation of the vehicle has a correct response speed.

Figure 1:
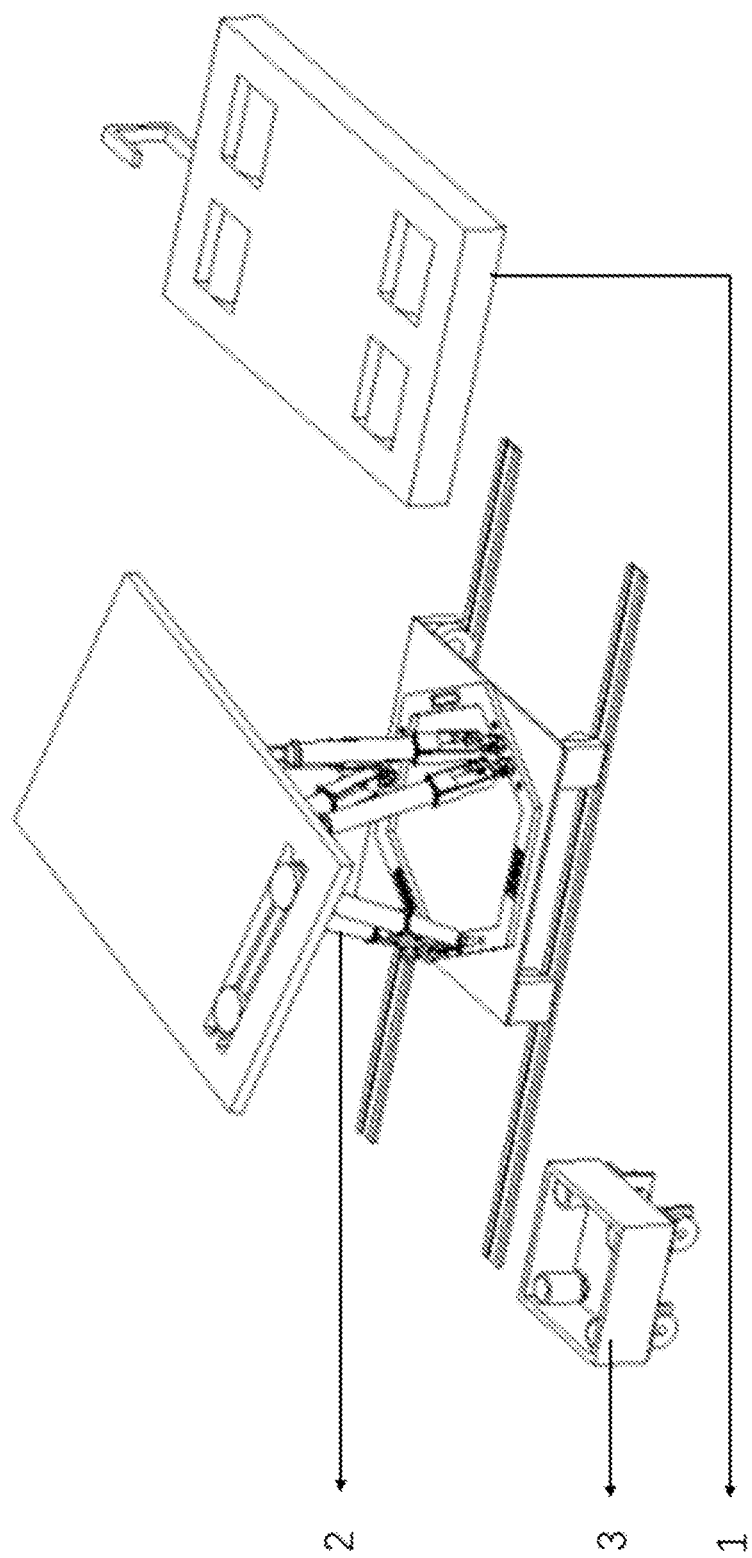
FIG. 1 is an overall schematic structural diagram of a system in the present invention.

In the figures: 1: rotary drum platform; 2: environment perception platform; 3: low-speed program-controlled electric vehicle; 4: rotary drum base; 5: adjustable-pitch rotary drum; 6: vehicle fixing member; 7: vehicle placing platform: 8: adjustable-pitch turntable mechanism; 9: six-degree-of-freedom movement mechanism; 10: support base; 11: transverse drive wheel; 12: transverse track; 13: vehicle frame; 14: steering motor; 15: drive motor base; 16: drive motor: and 17: wheel.

DESCRIPTION OF THE EMBODIMENTS

The following clearly and completely describes the technical solutions in embodiments of the present invention with reference to the accompanying drawings in the embodiments of the present invention. Apparently, the described embodiments are some of the embodiments of the present invention rather than all of the embodiments. All other embodiments obtained by a person of ordinary skill in the art based on the embodiments of the present invention without creative efforts shall fall within the protection scope of the present disclosure.

A specific working process and a principle of this system are as follows:

The whole vehicle in-loop system of an intelligent automobile includes a total of three working modes, namely, a simulation mode, a single-lane-in-loop mode, and a compound-in-loop mode.

The simulation mode is formed by an environment perception platform, a whole vehicle in-loop control system, a target vehicle simulation unit, and a test vehicle. The test vehicle is placed on the environment perception platform, the target vehicle simulation unit and the test vehicle form a test scenario, a real environment perception sensor of the test vehicle detects a scenario environment (the target vehicle simulation unit), and collected environmental data is inputted into a test vehicle control algorithm, to obtain a drive control signal, a brake control signal, a steering control signal, and the like. An engine output of the test vehicle is disconnected from a chassis drive, and the drive control signal, the brake control signal, the steering control signal, and the like of the test vehicle are connected to the whole vehicle in-loop control system of an intelligent automobile, and dynamics model calculation of the test vehicle is preset, to obtain real-time simulation dynamic parameters of the test vehicle (a speed, an acceleration deflection angle, a roll angle, a pitch angle, and the like). The dynamic parameters of the test vehicle are inputted into the environment perception platform through the whole vehicle in-loop control system of an intelligent automobile, and by using seven-degree-of-freedom characteristics of the environment perception platform, a driving feature of the test vehicle in a virtual simulation scenario is really simulated, to perform high-efficiency and accurate repetitive testing and assessment on the test vehicle for different virtual scenarios.

The single-lane-in-loop mode is formed by a rotary drum platform, the whole vehicle in-loop control system, the target vehicle simulation unit, and the test vehicle. Based on characteristics of the rotary drum platform (where the test vehicle cannot perform a steering operation on a rotary drum), it is especially tested for a scenario of straight driving of the test vehicle. The test vehicle is placed on the rotary drum platform, and the rotary drum is used to enable the test vehicle to reach a test speed required for the scenario. The real environment perception sensor of the test vehicle detects a scenario environment (the target vehicle simulation unit), collected environmental data is inputted into the test vehicle control algorithm, to obtain a drive control signal and a brake control signal to be transmitted to an execution mechanism of the test vehicle. By detecting drive and brake characteristics of the test vehicle in different scenarios, the automatic driving performance of the test vehicle during single-lane driving is evaluated. This mode adopts a dangerous scenario in which the test vehicle really reproduces single-lane driving, to perform high-efficiency and accurate repetitive testing and assessment on the test vehicle.

Testing and assessment in the compound-in-loop mode is the most real and complex, and the compound-in-loop mode is formed by the environment perception platform, the rotary drum platform, the target vehicle simulation unit, and the test vehicle. The test vehicles are placed on the rotary drum platform and the environment perception platform respectively, two test vehicles are connected to each other by a control system, and the target vehicle simulation unit and the environment perception platform together form a test scenario.

The test vehicle is fixed on the rotary drum platform, a longitudinal movement of the test vehicle is simulated by rotating the rotary drum, and information obtained by processing a speed through the control system is inputted into the target vehicle simulation unit. The target vehicle simulation unit and the test vehicle on the environment perception platform form a test scenario, the test vehicle on the environment perception platform detects surrounding environment information by using an in-vehicle sensor, performs calculation by using an in-vehicle control strategy, then outputs a signal, and inputs a steering signal into a steering wheel of the test vehicle on the environment perception platform, and a front wheel of the test vehicle is deflected when a real steering resistance torque is applied, which is measured by using an adjustable-pitch turntable. The drive signal and the brake signal are transmitted to the execution mechanism of the test vehicle on the rotary drum platform by using a vehicle data transmission interaction system, and a speed and an acceleration of the test vehicle are measured by using an adjustable-pitch rotary drum. By using the obtained speed, acceleration, and front wheel deflection angle of the test vehicle, a vehicle transverse movement parameter and a body posture parameter are obtained through model calculation, and are inputted into the environment perception platform to adjust a posture of the test vehicle. The environment perception platform drives a transverse drive wheel by using a motor, to enable the environment perception platform to move on a transverse guide rail, so as to simulate a transverse movement of the test vehicle. The pitch and roll movements of the vehicle are simulated by using a six-degree-of-freedom movement mechanism on the environment perception platform. A low-speed complex movement of a target vehicle is completed by a low-speed program-controlled electric vehicle. The program-controlled electric vehicle is placed around the environment perception platform, and a fake vehicle model is placed on the program-controlled electric vehicle, to simulate a track of the target vehicle. A high-speed simple movement of the target vehicle is completed by a high-speed linear program-controlled electric vehicle or a traction balloon vehicle, the traction balloon vehicle is suspended on a built track, and performs a traction movement by using a motor system and a wire rope, and positioning of the test vehicle and the target vehicle is provided by using a virtual map system.

Specific Embodiment

Figure 2:
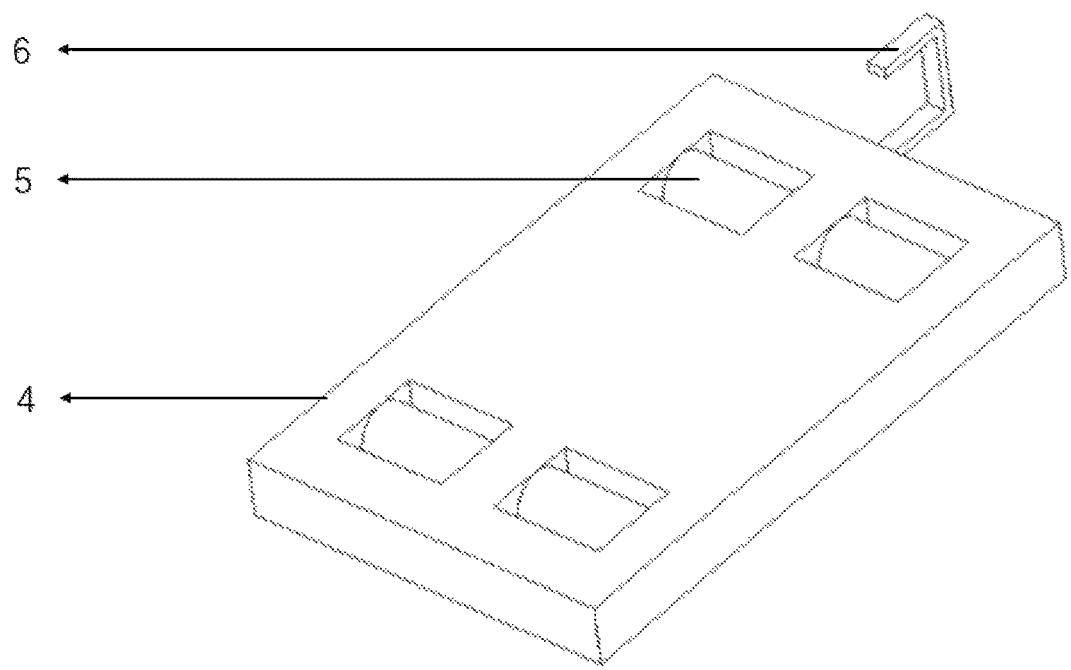
FIG. 2 is a schematic structural diagram of a rotary drum platform in the present invention.
Figure 3:
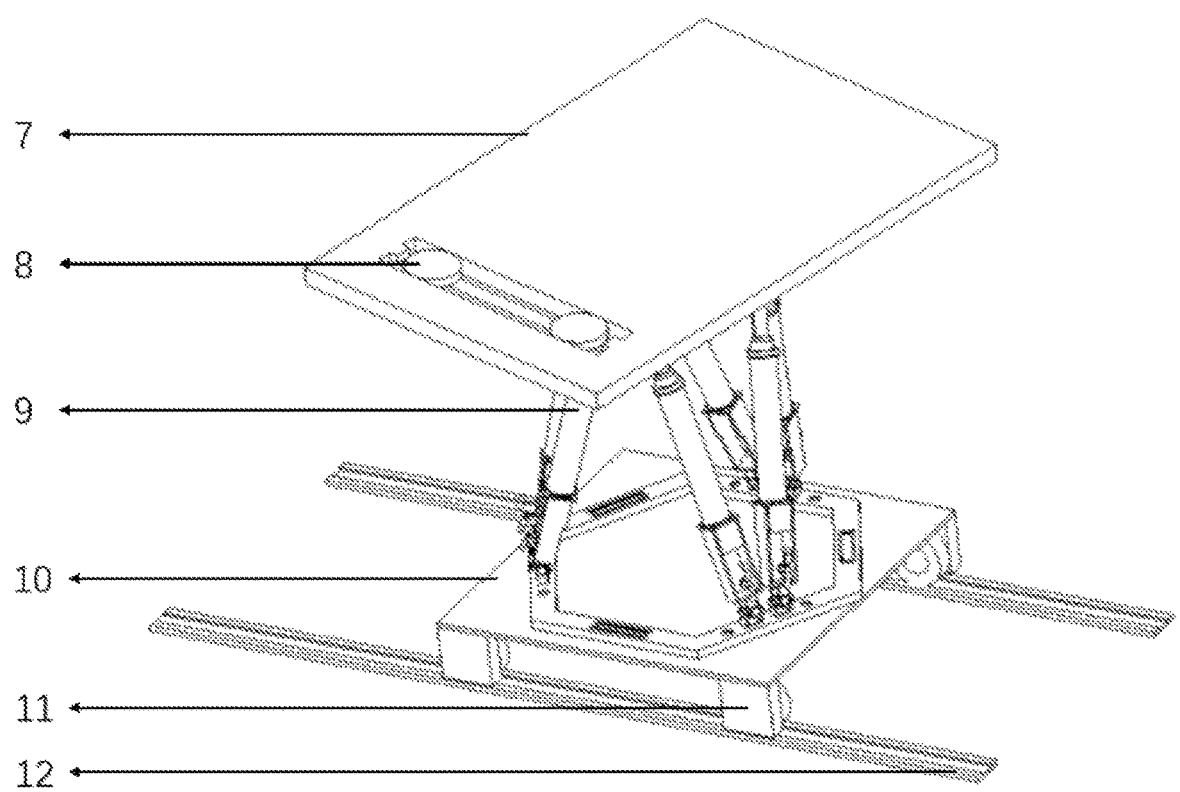
FIG. 3 is a schematic structural diagram of an environment perception platform in the present invention.
Figure 4:
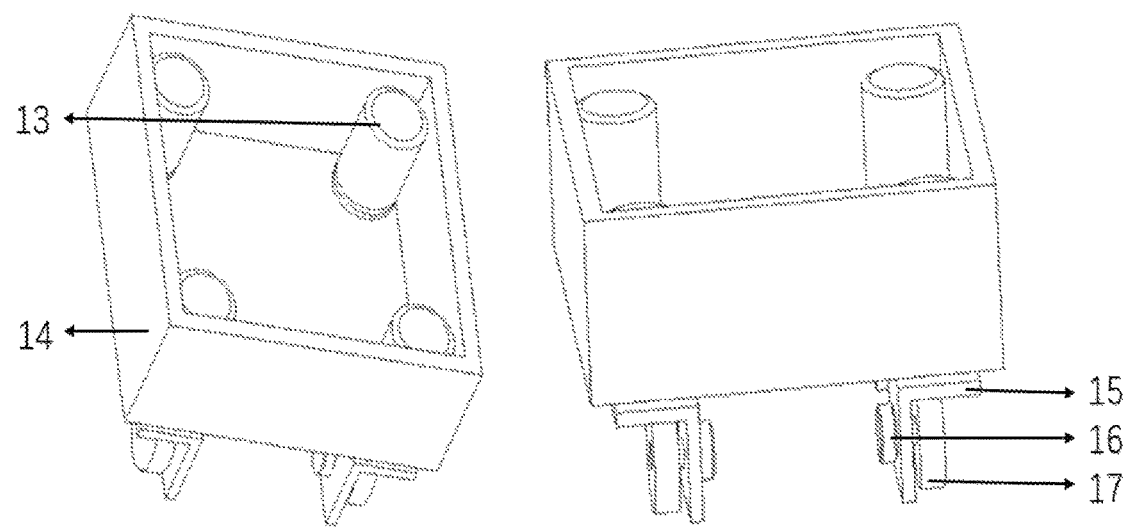
FIG. 4 is a schematic structural diagram of a program-controlled electric vehicle in the present invention.

As shown in FIG. 1, a whole vehicle in-loop test system of an intelligent automobile includes a rotary drum platform 1, used for simulating a longitudinal movement of a test vehicle. As shown in FIG. 2, the rotary drum platform includes: a rotary drum base 4, an adjustable-pitch rotary drum 5 mounted on the rotary drum base 4, and a vehicle fixing member 6 configured to fix the test vehicle. As shown in FIG. 3, an environment perception platform 2 is disposed at a front end of the rotary drum platform 1, is used for simulating a transverse movement of the test vehicle, and includes a support base 10 at a lower portion and a vehicle placing platform 7 at an upper portion, where a transverse drive wheel 11 is mounted at the lower portion of the support base 10, and the transverse drive wheel 11 moves along a transverse track disposed on the ground 12. As shown in FIG. 2, a target vehicle simulation unit is disposed at a periphery of the environment perception platform 2, and is configured to simulate a target vehicle. A six-degree-of-freedom movement mechanism 9 that simulates pitch and roll movements of the vehicle is disposed between support base 10 and the vehicle placing platform 7, and includes six movable rods and a hexagonal mounting base mounted on the support base 10. One end of the movable rod is connected to the hexagonal mounting base, the other end is connected to a lower end of the vehicle placing platform 7, and the movable rod is driven to move through a servo electric cylinder or an electric servo hydraulic cylinder. The support base 10 is provided with an adjustable-pitch turntable mechanism 8, which includes a sliding track, a turntable configured to fix a steering wheel of the test vehicle, and a servo unit configured to generate a steering resistance torque, the turntable is mounted on the sliding track, and is connected to the servo unit by a connecting rod assembly, and the servo unit is connected to a control unit, and is driven by an electric servo oil cylinder. As shown in FIG. 4, the target vehicle simulation unit includes a low-speed program-controlled electric vehicle 3 used for simulating a low-speed complex movement and a high-speed linear program-controlled electric vehicle or a traction balloon vehicle used for simulating a high-speed simple movement. The low-speed program-controlled electric vehicle 3 includes a vehicle frame 13, a steering motor 14 mounted inside the vehicle frame 13, and a drive wheel assembly mounted at a lower portion of the vehicle frame 13. The drive wheel assembly includes a drive motor 16 and a wheel 17 mounted on the drive motor 16. The drive motor 16 is mounted at the lower portion of the vehicle frame 13 by using a drive motor base 15, and two pairs are disposed in the front and rear. The system uses a virtual map to mark a virtual position of the vehicle in a test.

Figure 5:
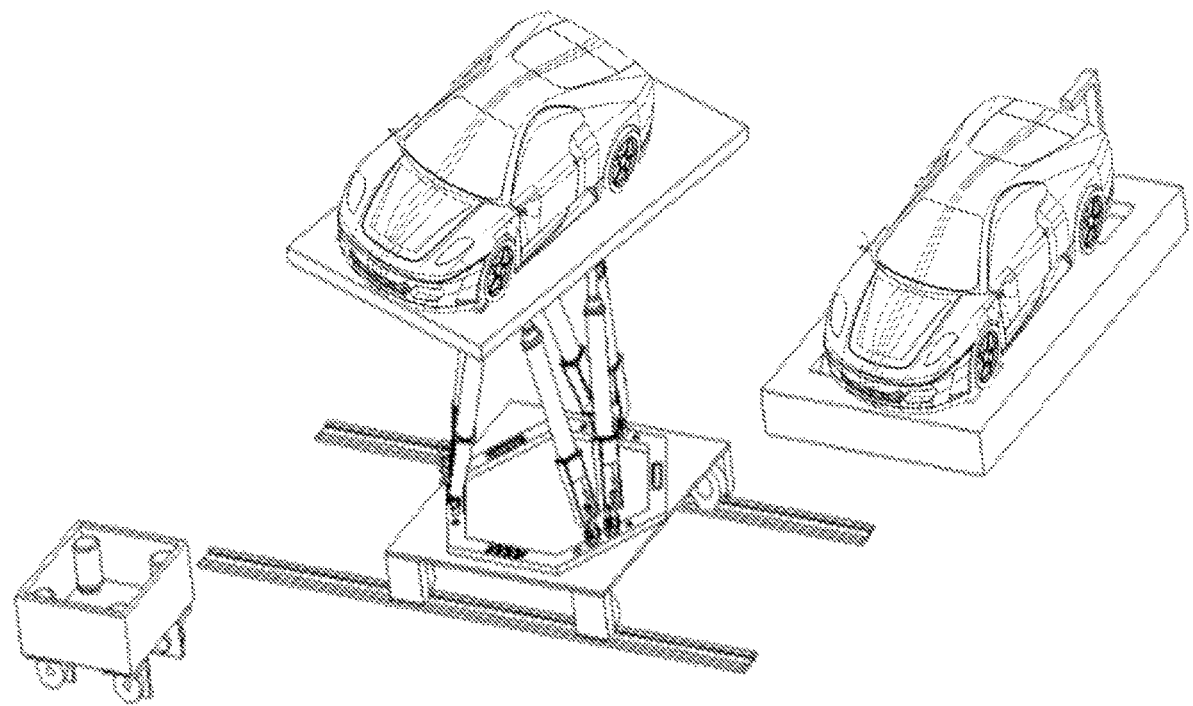
FIG. 5 is a schematic structural diagram of an actual use scenario of a system in the present invention.

As shown in FIG. 5, during specific use, the test vehicle is fixed on the rotary drum platform 1, a longitudinal movement of the test vehicle is simulated, and information obtained by processing a speed through the control system is inputted into the target vehicle simulation unit. The target vehicle simulation unit and the test vehicle on the environment perception platform form a test scenario, the test vehicle on the environment perception platform detects surrounding environment information by using an in-vehicle sensor, performs calculation by using an in-vehicle control strategy, then outputs a signal, and inputs a steering signal into a steering wheel of the test vehicle on the environment perception platform, and a front wheel of the test vehicle is deflected when a real steering resistance torque is applied, which is measured by using an adjustable-pitch turntable. The drive signal and the brake signal are transmitted to the execution mechanism of the test vehicle on the rotary drum platform by using a vehicle data transmission interaction system, and a speed and an acceleration of the test vehicle are measured by using an adjustable-pitch rotary drum. By using the obtained speed, acceleration, and front wheel deflection angle of the test vehicle, a vehicle transverse movement parameter and a body posture parameter are obtained through model calculation, and are inputted into the environment perception platform to adjust a posture of the test vehicle. The environment perception platform drives a transverse drive wheel by using a motor, to enable the environment perception platform to move on a transverse guide rail, so as to simulate a transverse movement of the test vehicle. The pitch and roll movements of the vehicle are simulated by using a six-degree-of-freedom movement mechanism on the environment perception platform. A low-speed complex movement of a target vehicle is completed by a low-speed program-controlled electric vehicle. The program-controlled electric vehicle is placed around the environment perception platform, and a fake vehicle model is placed on the program-controlled electric vehicle, to simulate a track of the target vehicle. A high-speed simple movement of the target vehicle is completed by a high-speed linear program-controlled electric vehicle or a traction balloon vehicle, the traction balloon vehicle is suspended on a built track, and performs a traction movement by using a motor system and a wire rope, and positioning of the test vehicle and the target vehicle is provided by using a virtual map system.

In this embodiment, when the test vehicle changes lines to the left from a normal driving lane to an overtaking lane on a highway, a dangerous scenario in which the target vehicle drives at a high speed from the rear of the overtaking lane.

Scenario absolute parameters are as follows:

An absolute speed of the test vehicle is 80 km/h, an absolute speed of the target vehicle is 130 km/h, a longitudinal distance between centers of mass of the two vehicles is 60 m, and a transverse distance is 3.75 m.

Vehicle in-loop test parameters are as follows:

A longitudinal relative speed of the test vehicle is 0, and a maximum transverse relative speed is 9 km/h. By simulating the transverse movement of the environment perception platform 2, a longitudinal relative speed of the target vehicle is 50 km/h, which is simulated by using the program-controlled electric vehicle 3.

The test vehicle is fixed on the rotary drum platform 1, and the speed of the test vehicle reaches 80 km/h by using the adjustable-pitch rotary drum 5. After the low-speed program-controlled electric vehicle 3 accelerates from 0 to 50 km/h, the low-speed program-controlled electric vehicle and the test vehicle on the environment perception platform 2 form a test scenario.

The test vehicle on the environment perception platform 2 detects, by using the in-vehicle sensor, the low-speed program-controlled electric vehicle 3 approaching at 50 km/h during a lane change, performs calculation by using detected information by using the in-vehicle control strategy, and then outputs a steering signal, a drive signal, and a brake signal.

The steering signal is transmitted to the steering wheel of the test vehicle on the environment perception platform 2, a steering resistance torque of the test vehicle at a speed of 80 km/h is applied, a front wheel of the test vehicle is deflected, and a steering parameter is measured by using the adjustable-pitch turntable mechanism 8.

The drive signal and the brake signal are transmitted to the execution mechanism of the test vehicle on the rotary drum platform 1 by using a vehicle data transmission interaction system, and a drive parameter and a brake parameter of the test vehicle are measured by using an adjustable-pitch rotary drum 5. The obtained steering parameter, drive parameter, and brake parameter are inputted into a vehicle dynamics model preset in the control system to obtain transverse, weaving and roll movement parameters of the test vehicle in this scenario. For example, a maximum transverse speed is 1.8 meters per second, a maximum transverse acceleration is a square of 1.5 meters per second, a maximum weaving angle is 5.5 degrees, and a maximum weaving angular speed is 4.5 degrees per second. The movement parameters are inputted into the control system, and transverse, weaving and roll movements of the test vehicle during a lane change are simulated by using the six-degree-of-freedom movement mechanism 9 and the transverse drive wheel 11, to really reproduce a detection situation of the in-vehicle sensor when the vehicle changes a lane.

In the present invention, the vehicle in-loop test platform can not only obtain the real vehicle dynamics parameters of the longitudinal movement of the test vehicle by using the rotary drum platform, but also obtain the vehicle dynamics parameters such as the transverse, weaving, pitch and roll movements by using the environment perception platform, to further really reproduce a situation in which the in-vehicle sensor detects the surrounding road environment when the vehicle changes a lane. Complete real data of the test vehicle and the road environment can provide a reference for the development and research of functions in the ADAS and the automatic driving system for such scenarios.

The foregoing descriptions are merely specific implementations of the present invention, but are not intended to limit the protection scope of the present invention. Various equivalent modifications or replacements readily figured out by a person skilled in the art within the technical scope disclosed in the present invention shall fall within the protection scope of the present invention. Therefore, the protection scope of the present invention shall be subject to the protection scope of the claims.

What is claimed is:

1. A whole vehicle in-loop test system of an intelligent automobile, wherein the system comprises:
   a rotary drum platform, configured for simulating a longitudinal movement of a test vehicle;
   an environment perception platform, configured for simulating a transverse movement of the test vehicle; and
   a target vehicle simulation unit, configured to simulate a target vehicle, characterized in that the test vehicles are placed on the rotary drum platform and the environment perception platform respectively, all the test vehicles are connected to each other by a control subsystem, and the target vehicle simulation unit and the environment perception platform form a test scenario,
   wherein the environment perception platform comprises a support base and a vehicle placement platform connected to each other by a multi-degree of freedom movement mechanism configured to simulate pitch and roll movements of the test vehicle, a transverse drive wheel is disposed at a bottom of the support base, and the transverse drive wheel moves along a transverse track disposed on the ground.

2. The whole vehicle in-loop test system of an intelligent automobile according to claim 1, wherein the rotary drum platform comprises a rotary drum base, and the rotary drum base is provided with a rotary drum and a vehicle fixing member configured to fix the test vehicle.

3. The whole vehicle in-loop test system of an intelligent automobile according to claim 2, wherein the rotary drum is an adjustable-pitch rotary drum, and there are at least two pairs of adjustable-pitch rotary drums.

4. The whole vehicle in-loop test system of an intelligent automobile according to claim 1, wherein the target vehicle simulation unit comprises a program-controlled electric vehicle configured for simulating a complex movement and a linear program-controlled electric vehicle or a traction balloon vehicle configured for simulating a simple movement.

5. The whole vehicle in-loop test system of an intelligent automobile according to claim 4, wherein the program-controlled electric vehicle comprises a vehicle frame, a steering motor disposed in the vehicle frame, and a drive wheel assembly disposed at a bottom of the vehicle frame.

6. The whole vehicle in-loop test system of an intelligent automobile according to claim 5, wherein the drive wheel assembly comprises a drive motor and a wheel disposed on the drive motor, and the drive motor is disposed at a bottom of the vehicle frame through a drive motor base.

7. The whole vehicle in-loop test system of an intelligent automobile according to claim 1, wherein the multi-degree of freedom movement mechanism comprises a plurality of movable rods and a polygonal mounting base mounted on the support base, one end of the movable rod is connected to the polygonal mounting base, the other end is connected to the vehicle placing platform, and the movable rod is driven to move through a servo electric cylinder or an electric servo hydraulic cylinder.

8. The whole vehicle in-loop test system of an intelligent automobile according to claim 7, wherein the vehicle placing platform is provided with an adjustable-pitch turntable mechanism, the adjustable-pitch turntable mechanism comprises a sliding track, a turntable configured to fix a steering wheel of the test vehicle, and a servo unit configured to generate a steering resistance torque, the turntable is disposed on the sliding track, and is connected to the servo unit by a connecting rod assembly, and the servo unit is connected to the control subsystem, and is driven by an electric servo oil cylinder.

9. The whole vehicle in-loop test system of an intelligent automobile according to claim 1, wherein the system uses a virtual map to mark a virtual position of the test vehicle in a test.

\* \* \* \* \*